No. 716,474. Patented Dec. 23, 1902.
O. J. PRICE.
APPARATUS FOR MANUFACTURING AND DISPENSING CARBONATED BEVERAGES.
(Application filed Nov. 5, 1900. Renewed June 21, 1902.)
(No Model.) 2 Sheets—Sheet 1.
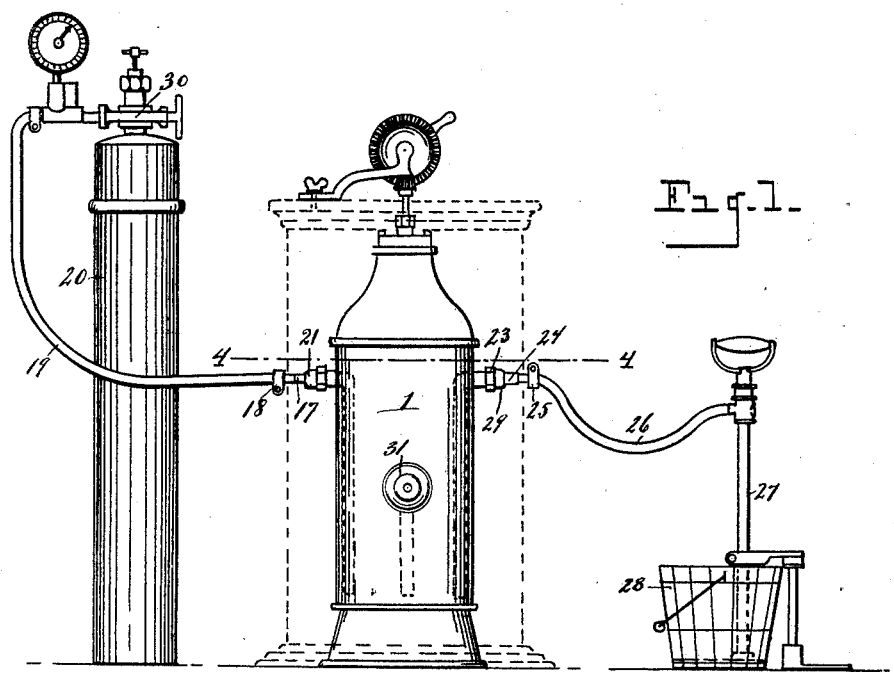
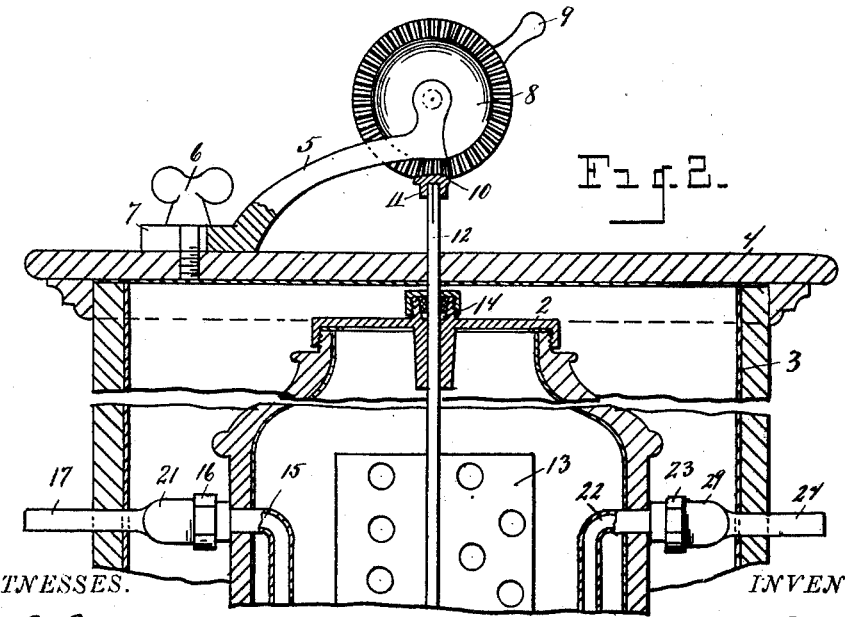
WITNESSES. INVENTOR.
Attorneys.
THE NORRIS PETERS CO., PHOTO-LITHO., WASHINGTON, D. C.

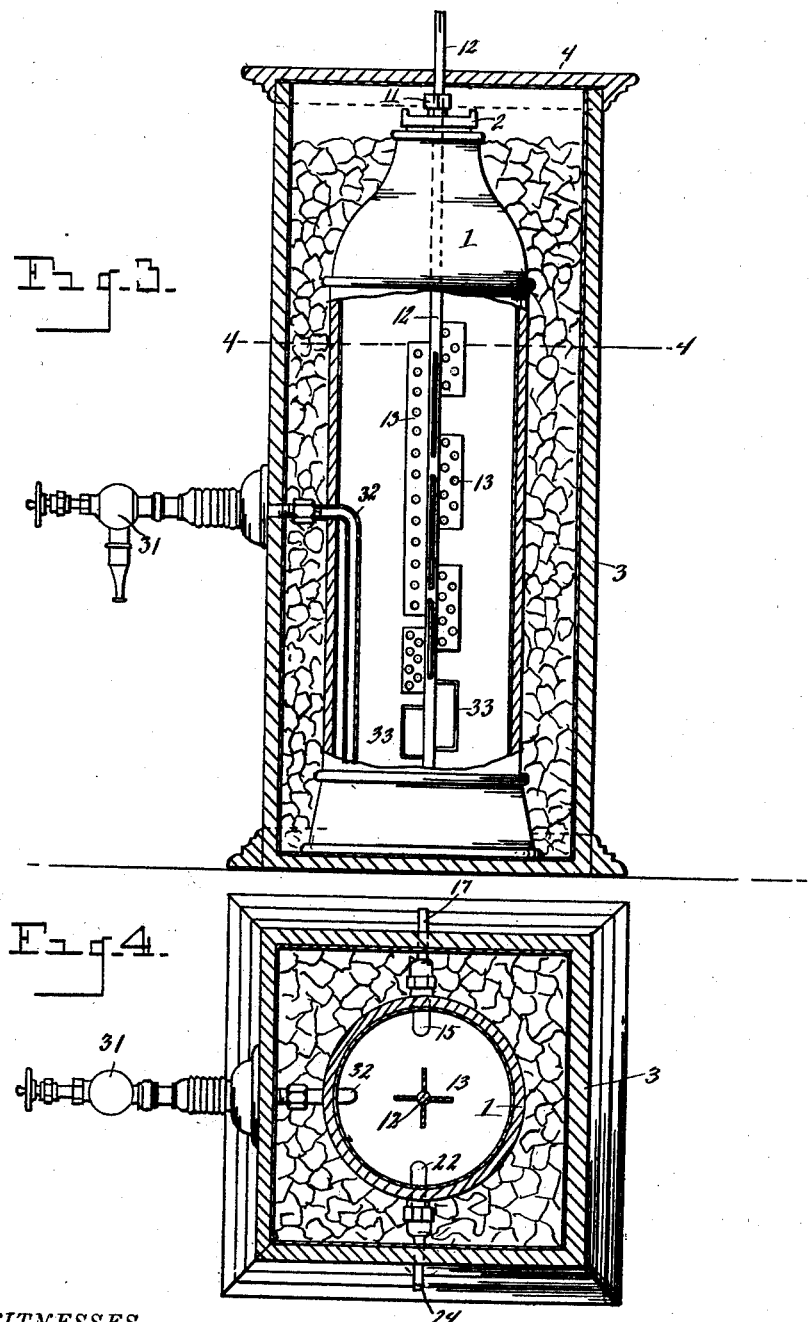

UNITED STATES PATENT OFFICE.

ORRIN J. PRICE, OF DETROIT, MICHIGAN.

APPARATUS FOR MANUFACTURING AND DISPENSING CARBONATED BEVERAGES.

SPECIFICATION forming part of Letters Patent No. 716,474, dated December 23, 1902.

Application filed November 5, 1900. Renewed June 21, 1902. Serial No. 112,596. (No model.)

*To all whom it may concern:*

Be it known that I, ORRIN J. PRICE, a citizen of the United States, residing at Detroit, in the county of Wayne, State of Michigan, have invented a certain new and useful Improvement in Apparatus for Manufacturing and Dispensing Carbonated Beverages; and I do declare the following to be a full, clear, and exact description of the invention, such as will enable others skilled in the art to which it appertains to make and use the same, reference being had to the accompanying drawings, and to the figures of reference marked thereon, which form a part of this specification.

This invention relates to apparatus for manufacturing and dispensing carbonated beverages; and it consists in the construction and arrangement of parts hereinafter fully set forth, and pointed out particularly in the claims.

The object of the invention is to provide means for manufacturing carbonated beverage in the same tank from which it is dispensed, making one tank serve as carbonater, dispenser, and cooler, and obviating the use of a second tank in which the beverage is usually charged and from which it is conveyed in pipes to the cooler.

The above object is attained by the apparatus illustrated in the accompanying drawings, in which—

Figure 1 is a general view showing the mixing and dispensing tank, the gas-cylinder and beverage-supply pump connected therewith, and the gearing for driving the agitator within the tank, the dotted lines illustrating the outline of the inclosing case adapted to contain the ice. Fig. 2 is an enlarged vertical section in detail through the case and the upper end of the tank contained therein, showing the manner of mounting the gearing for driving the agitator and the connection between the stem of the agitator and said gearing. Fig. 3 is a central vertical section through the outer case and a portion of the beverage-containing tank, showing the draft-tube extending into said tank and the agitator therein in elevation. Fig. 4 is a horizontal section, as on line 4 4 of Fig. 3.

Referring to the characters of reference, 1 designates the beverage-containing tank, which may be of any suitable construction and which is provided with a removable screw-cap 2. This tank is adapted to be placed in a suitable case or ice-box 3, so that ice may be packed around the tank to cool its contents, as shown in Figs. 3 and 4.

Mounted upon the cover 4 of the case is a bracket-arm 5, which is secured in place by a thumb-screw 6, passing through a slotted opening 7 in said bracket and into said cover, whereby said arm may be firmly secured in place and is allowed sufficient movement to enable it to be properly adjusted. Mounted upon said bracket is a large gear-wheel 8, having a handle 9, through the medium of which it may be rotated. Also journaled in said bracket is a pinion 10, which meshes with said gear-wheel and is provided in its under face with a square socket 11, adapted to receive the upper end of the stem 12 of the agitator located within the beverage-containing tank and comprising the radial perforated wings 13, which are mounted upon said stem 12. The lower end of said stem is stepped in the bottom of the tank, and the upper end thereof passes through a stuffing-box 14 in the cap 2 and through the cover 4 of the case in position to enter the socket of the pinion 10. It will therefore be understood that by a rotation of the gear-wheel 8 the agitator will be revolved at a high rate of speed within the tank, whereby the charging-gas is caused to mix with or permeate the beverage or contents of said tank.

Passing through the wall of the tank at one side is a tube 15, whose inner end extends downwardly to a point adjacent the bottom of the tank. Connected to the outer end of said tube by a coupling 16 is a pipe-section 17, whose outer end extends through the casing and is adapted to be attached, by means of a clamp 18, with the hose 19, leading from the gas-cylinder 20. In the pipe 17 is a valve-chamber 21, containing an ordinary check-valve (not shown) to prevent an outward flow of the contents of the tank. Passing through the opposite wall of the cylinder is a tube 22, the inner end of which also extends downwardly to a point near the bottom of the tank and whose outer end is connected by a coupling 23 with a pipe-section 24, passing through the casing and adapted to be connected by a clamp 25 with the hose 26, leading from the hand-pump 27, through the medium of which the beverage or liquid with which the tank is to be filled may be forced. Said pump is adapted to stand in a pail 28 or other receptacle, from which the beverage is pumped. In the pipe 24 is a valve-chamber 29, containing an ordinary check-valve (not shown) to prevent a backward flow of the beverage.

Ordinarily in dispensing carbonated beverages the tank containing the beverage is connected with a coil, which passes through a cooler and is attached to a draft-tube from which the beverage is drawn. After the tank has become exhausted it must be detached and removed for replenishing. As a rule several such tanks are required, so that a filled and charged tank may be always ready to take the place of an exhausted one. This arrangement necessitates the uncoupling of the exhausted tank from the cooling-coil, the attachment of the charged or filled tank thereto, and the moving of the heavy tanks from place to place. In the application of my invention the above objections are overcome. There is but one tank necessary, which serves as a cooler and dispensing-receptacle and also as the receptacle in which the beverage is manufactured. As an illustration, we will assume that a tank is employed for dispensing ginger-ale. When the beverage becomes exhausted, the hose-pipe 26, which is connected to the pump 27, is attached to the pipe 24 and said pump placed in a receptacle containing said beverage, which is pumped thereby into the tank until said tank is filled to the desired height, when the hose 26 may be detached from the pipe 24 and the pump removed. It is then necessary to charge the beverage in the tank with the requisite amount of gas to create the desired pressure. This is accomplished by connecting the pipe 19 of the gas-cylinder to the pipe 17 and opening the valve 30 on said gas-cylinder to allow the gas to pass into the tank 1. After a certain quantity of gas has been admitted to the tank it is caused to permeate the beverage therein by a rotation of the mixer or agitator through the medium of the gears 8 and 10. The movement of the agitator causes the beverage to take up the gas, and the operation of admitting the gas to the tank and of rotating the agitator is repeated until the beverage becomes sufficiently charged, when the hose-pipe 19 is detached from the pipe-section 17 and the gas-cylinder removed. If desired, the gearing for driving the agitator may also be removed by loosening the thumb-screw 6, so as to allow of the detachment of the bracket 5, carrying said gearing. The tank is then charged within the cooler, and the beverage therein is ready to be drawn off through the draft-tube 31, whose supply-pipe 32 extends into said tank and downward to a point near the bottom thereof.

As often as the tank becomes exhausted it may be refilled and recharged without removing it from the cooler by simply attaching the pump and the gas-cylinder thereto, as before described, and when the tank has been recharged the beverage therein may be dispensed directly therefrom without the use of cooling-coils or other apparatus, enabling the beverage to be manufactured and sold from one and the same tank and affording a cheap and efficient apparatus.

Instead of making the agitator of radially-projecting perforated wings 13 said wings may be formed of wire loops 33, as shown at the bottom of the stem 12.

Having thus fully set forth my invention, what I claim as new, and desire to secure by Letters Patent, is—

1. In an apparatus for manufacturing carbonated beverages, the combination of a combined mixing and dispensing tank, a beverage-pipe extending into said tank and projecting through the wall thereof, a portable pump detachably connected with a beverage-receptacle, a detachable coupling connecting said pump with the projecting end of said beverage-pipe, a check-valve in said beverage-pipe located between the detachable coupling and the interior of the tank, a gas-pipe communicating with said tank, a check-valve in said gas-pipe, a portable gas-cylinder connected to said gas-pipe independently of said pump, a detachable coupling in said gas-pipe located between said check-valve and said gas-cylinder, an agitator within said tank, and means for operating said agitator.

2. In an apparatus for manufacturing and dispensing carbonated beverages, the combination of a stationary mixing and dispensing tank, a beverage-pipe projecting from said tank, a portable independent pump for forcing the beverage into said tank, a detachable coupling connecting said pump to said beverage-pipe, a gas-pipe projecting from said tank, a portable gas-cylinder, a coupling detachably connecting said projecting gas-pipe to said cylinder independently of the pump, a valve in the outer end of each of said pipes, a cooler embracing said tank, a draft-tube communicating with the tank and passing through the side of the tank and cooler independently of said other pipes, an agitator within the tank and means for operating said agitator.

3. In a device for manufacturing and dispensing carbonated beverages, the combination of a mixing and dispensing tank, a cooling-case entirely inclosing said tank, means detachably connected with said tank for forcing beverage and gas independently therein, a draft-tube passing through the side of the tank and cooler, an agitator within the tank having a stem extending through the top of the tank and casing, a bracket mounted on the top of the casing carrying driving-gears adapted to be connected with the stem of the agitator.

In testimony whereof I sign this specification in the presence of two witnesses.

ORRIN J. PRICE.

Witnesses:
E. S. WHEELER,
C. EDNA JOSLIN.